(12) United States Patent
Mendoza et al.

(10) Patent No.: US 11,335,898 B2
(45) Date of Patent: May 17, 2022

(54) BATTERY CARBON FIBER ELECTRODE MAKING MACHINE AND METHOD

(71) Applicant: Wirtz Manufacturing Co., Inc., Port Huron, MI (US)

(72) Inventors: Roel Mendoza, Palms, MI (US); John O. Wirtz, Burtchville, MI (US)

(73) Assignee: Wirtz Manufacturing Co., Inc., Port Huron, MI (US)

( * ) Notice: Subject to any disclaimer, the term of this patent is extended or adjusted under 35 U.S.C. 154(b) by 0 days.

(21) Appl. No.: 16/823,754

(22) Filed: Mar. 19, 2020

(65) Prior Publication Data
US 2020/0303719 A1 Sep. 24, 2020

Related U.S. Application Data

(60) Provisional application No. 62/820,580, filed on Mar. 19, 2019.

(51) Int. Cl.
| | |
|---|---|
| *H01M 4/04* | (2006.01) |
| *H01M 4/583* | (2010.01) |
| *H01M 4/68* | (2006.01) |
| *H01M 4/66* | (2006.01) |
| *H01M 4/02* | (2006.01) |

(52) U.S. Cl.
CPC ......... *H01M 4/0485* (2013.01); *H01M 4/583* (2013.01); *H01M 4/661* (2013.01); *H01M 4/685* (2013.01); *H01M 2004/021* (2013.01)

(58) Field of Classification Search
CPC .... H01M 4/583; H01M 4/0485; H01M 4/661; H01M 4/685
See application file for complete search history.

(56) References Cited

U.S. PATENT DOCUMENTS

| | | | |
|---|---|---|---|
| 3,926,674 A | 12/1975 | Jonville et al. | |
| 4,489,772 A | 12/1984 | McLane et al. | |
| 5,590,702 A | 1/1997 | Schenk | |
| 8,701,745 B2 | 4/2014 | Rossi et al. | |
| 9,543,589 B2 | 1/2017 | Christie et al. | |
| 9,666,865 B2 | 5/2017 | He et al. | |
| 10,096,819 B2 | 10/2018 | Abrahamson et al. | |
| 2002/0182487 A1* | 12/2002 | Wirtz | H01M 4/73 429/130 |
| 2010/0215837 A1 | 8/2010 | Evans | |
| 2011/0111301 A1* | 5/2011 | Rossi | B22D 11/001 429/225 |
| 2011/0286490 A1 | 11/2011 | Abrahamson et al. | |
| 2012/0301790 A1* | 11/2012 | Xiao | H01M 4/139 429/241 |
| 2013/0004842 A1 | 1/2013 | Abrahamson | |
| 2015/0017545 A1 | 1/2015 | Christie et al. | |

(Continued)

OTHER PUBLICATIONS

PCT/US2020/023590 International Search Report and Written Opinion dated Jun. 19, 2020 (Jun. 19, 2020).

*Primary Examiner* — Kenneth J Douyette
(74) *Attorney, Agent, or Firm* — Reising Ethington P.C.

(57) ABSTRACT

A machine and process for making a composite battery electrode with a conductive lead cast ribbon extending along and attached to a portion of a carbon fiber material. A lead ribbon may be continuously cast along a longitudinally elongate strip of carbon fiber material. The ribbon may be cast along an edge or edges of a longitudinally elongate strip of carbon fiber material.

20 Claims, 16 Drawing Sheets

(56) References Cited

U.S. PATENT DOCUMENTS

| | | |
|---|---|---|
| 2015/0079440 A1 | 3/2015 | Reich |
| 2015/0255783 A1 | 9/2015 | Abrahamson et al. |
| 2017/0104218 A1 | 4/2017 | Christie et al. |
| 2017/0346068 A1* | 11/2017 | Abrahamson ........... H01M 4/16 |
| 2018/0366719 A1 | 12/2018 | Abrahamson et al. |

* cited by examiner

BATTERY CARBON FIBER ELECTRODE MAKING MACHINE AND METHOD

CROSS-REFERENCE TO RELATED APPLICATION

This application claims the benefit of U.S. Provisional Application No. 62/820,580 filed Mar. 19, 2019 which is herein incorporated by reference in its entirety.

TECHNICAL FIELD

A variety of different types of batteries have electrodes of a carbon fiber material connected to a lead conductor. There is a need for a way to cost effectively mass produce electrodes of a carbon fiber material attached to a lead conductor.

The present invention relates generally to battery electrodes of a carbon fiber material and more particularly to a machine for and method of making battery composite electrodes with a carbon fiber material electrically connected with a lead conductor.

SUMMARY

In at least some embodiments, a method and machine for casting a composite lead or lead alloy carbon fiber electrode may include providing a continuous flow of liquid lead or lead alloy onto a longitudinally elongate strip of carbon fiber material with the liquid lead or lead alloy forming a ribbon on the fiber material having a width less than the transverse width of the strip of carbon fiber material. In at least some implementations, a portion of the strip of carbon fiber material may be compressed to inhibit flow of the liquid lead or lead alloy transversely into the carbon fiber material. The strip of carbon fiber material with the ribbon thereon may be severed to provide a plurality of individual electrodes.

In at least some implementations the machine have a rotatable drum with at least one mold cavity extending circumferentially around the drum and configured to underlie only a portion of the transverse width of a strip of longitudinally elongate material received in part on the drum, a shoe with at least one orifice opening onto a portion of the strip overlying the mold cavity and configured to supply liquid lead or lead alloy to the mold cavity and a portion of the strip overlying the mold cavity, and the shoe having an inlet and an outlet communicating with the orifice, and a device configured to supply liquid lead or lead alloy to the inlet in a quantity in excess of that required to provide a continuous flow through the orifice to progressively fill a portion of the mold cavity and engage at least part of the overlying strip as they move past the orifice with excess lead or lead alloy flowing through the outlet.

In at least some implementations a rib may extend circumferentially around the drum and underlie the strip to limit the extent of generally axial flow of liquid lead or lead alloy onto the strip.

In at least some implementations the orifice may have a first portion extending generally axially across at least part of the mold cavity and a second portion extending across part of the strip and spaced from the first portion. In at least some implementations the first portion may be axially elongate. In at least some implementations the second portion may be circumferentially elongate.

In at least some implementations the cavity may have a plurality of circumferentially spaced apart ribs in the cavity. The ribs may extend generally parallel to the axis of rotation of the drum.

In at least some implementations the shoe may have a rib adjacent one end of the orifice, extending into the cavity and extending circumferentially upstream of the orifice relative to the direction of rotation of the drum. In some implementations the shoe may have a second rib adjacent the other end of the orifice, extending into the cavity and extending circumferentially upstream of the orifice relative to the direction of rotation of the drum.

In at least some implementations the shoe may have at least one rib bearing on the strip, spaced from the orifice and compressing the strip between the rib and the drum.

BRIEF DESCRIPTION OF THE DRAWINGS

The following detailed description of preferred embodiments and best mode of a method and machine for making battery electrodes of a carbon fiber material connected to a lead or lead alloy conductor will be set forth with reference to the accompanying drawings in which.

DETAILED DESCRIPTION

Figure 1:
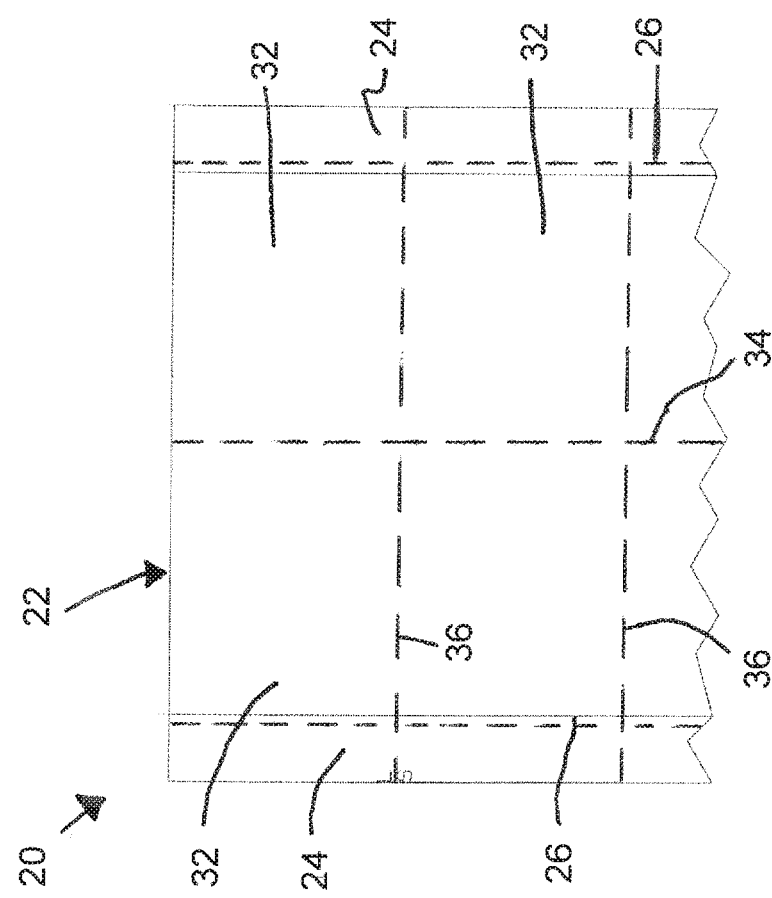
FIG. 1 is a fragmentary plan view of a longitudinally elongate composite strip of a carbon fiber material with a lead conductor ribbon attached along each elongate edge of the strip of carbon fiber material.
Figure 2:
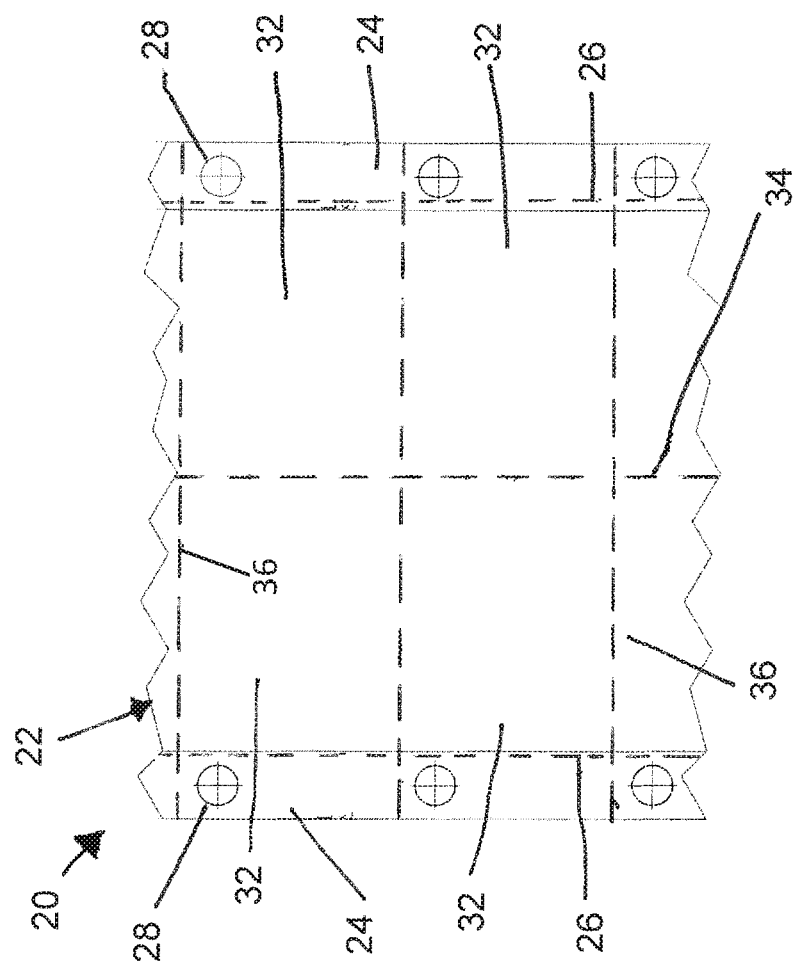
FIG. 2 is a fragmentary plan view a longitudinally elongate composite strip of a carbon fiber material with a lead conductor ribbon attached along each elongate edge of the strip with equally spaced apart locator holes through each lead ribbon.
Figure 3:
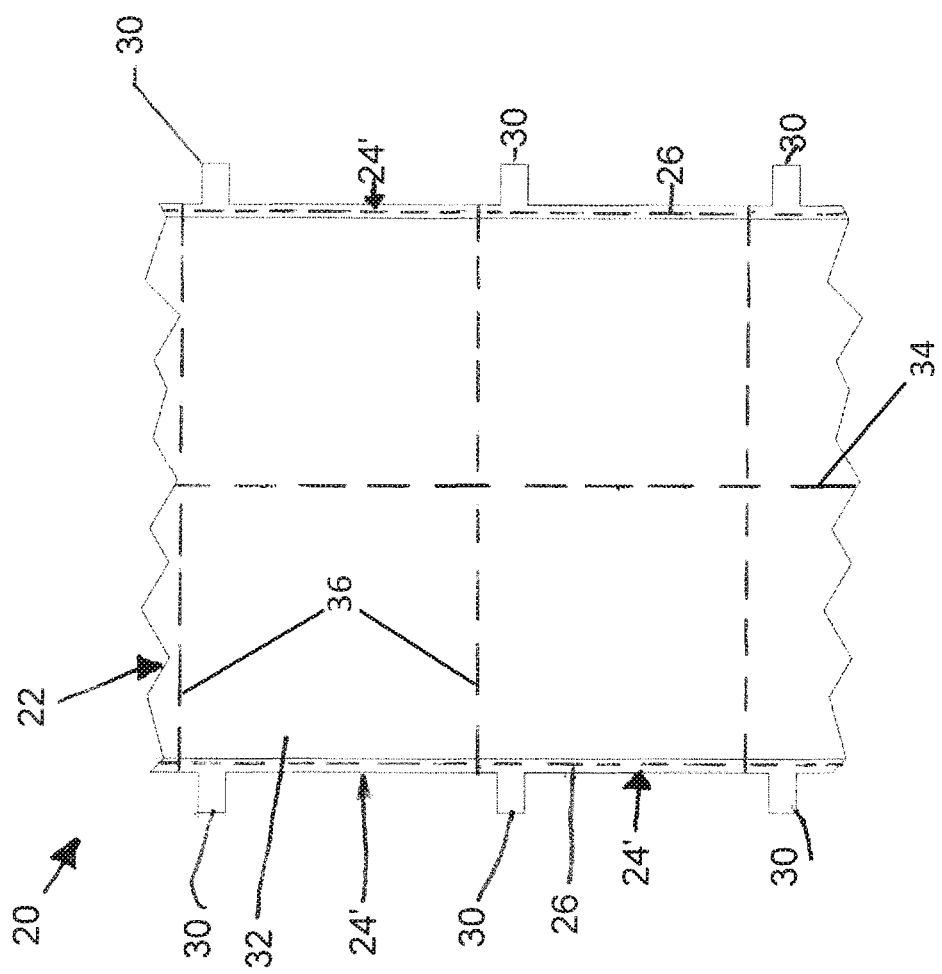
FIG. 3 is a fragmentary plan view of a longitudinally elongate composite strip of a carbon fiber material with a lead conductor ribbon attached along each elongate edge of the strip with lugs of each lead ribbon.

Referring in more detail to the drawings, FIG. 1 illustrate a longitudinally elongate composite strip 20 of electrically conductive carbon fiber material 22 with a longitudinally elongate electrically conductive cast lead or lead alloy ribbon 24 (hereinafter lead ribbon) attached to each longitudinal edge 26 of the carbon fiber material. FIG. 2 illustrates the elongate composite strip 20 with locator indicia desirably in the form of uniformly longitudinally spaced apart holes 28 in each lead ribbon. These holes 28 may be formed when casting the lead ribbon or after the lead ribbon has been cast to the carbon fiber material 22 such as by punching the holes through each lead ribbon. FIG. 3 illustrates the elongate composite strip 20 in which each lead ribbon 24' includes equally longitudinally spaced apart lugs 30 which may be formed either when casting the lead ribbons or by stamping, punching, severing or otherwise cutting away portions of each cast ribbon 24 to form the lugs thereof. To form individual electrodes 32 of carbon fiber material with a lead ribbon attached along one edge, all forms of the elongate strip may 20 be severed longitudinally as indicated by the broken line 34 and transversely as indicated by broken lines 36. Alternatively, a composite longitudinally elongate strip may be formed with a lead ribbon along only one longitudinal edge of a strip of carbon fiber material and severed transversely to form a plurality of individual electrodes 32.

Typically, each lead ribbon may have a nominal thickness in the range of about 0.030 to 0.080 of an inch and a transverse width in the range of about 1.2 to 2.0 inches. The carbon fiber material may have a thickness in the range of about 0.030 to 0.180 of an inch and for automotive batteries a transverse width of about 6 to 12 inches and desirably 8 to 10 inches if lead ribbons will be attached along both longitudinal edges and a transverse width in the range of about 3 to 6 inches if a lead ribbon will be attached along only one longitudinal edge. For stationary batteries the carbon fiber material may have a transverse width in the range of about 6 to 12 inches where a lead ribbon is attached along only one longitudinally elongate edge. Typically, the carbon fiber material may include a variety of electrically conductive carbon or graphite fibers (hereinafter both referred to as carbon fiber material) which may be several hundred feet in length and sufficiently flexible that they may be coiled into rolls. Suitable elongate strips of carbon fiber material commonly referred to as carbon fiber felt are commercially available.

A suitable method of making carbon fiber electrodes 32 includes casting liquid lead or a liquid lead alloy into an electrically conductive lead ribbon 24 along one or both edges 26 of a longitudinally elongate strip of carbon fiber material 22 to produce a composite strip 20 and thereafter severing the carbon fiber material and attached lead ribbon or ribbons to form a plurality of individual electrodes 32. Depending on the desired application and downstream processing of the composite strip 20, each lead ribbon may have locator holes 28 and/or lugs 30 either cast therein or subsequently formed by various punching, stamping, cutting, shearing, and/or severing operations which remove portions of the cast lead ribbon to form the locator holes in and/or lugs of the cast lead ribbon.

Figure 4:
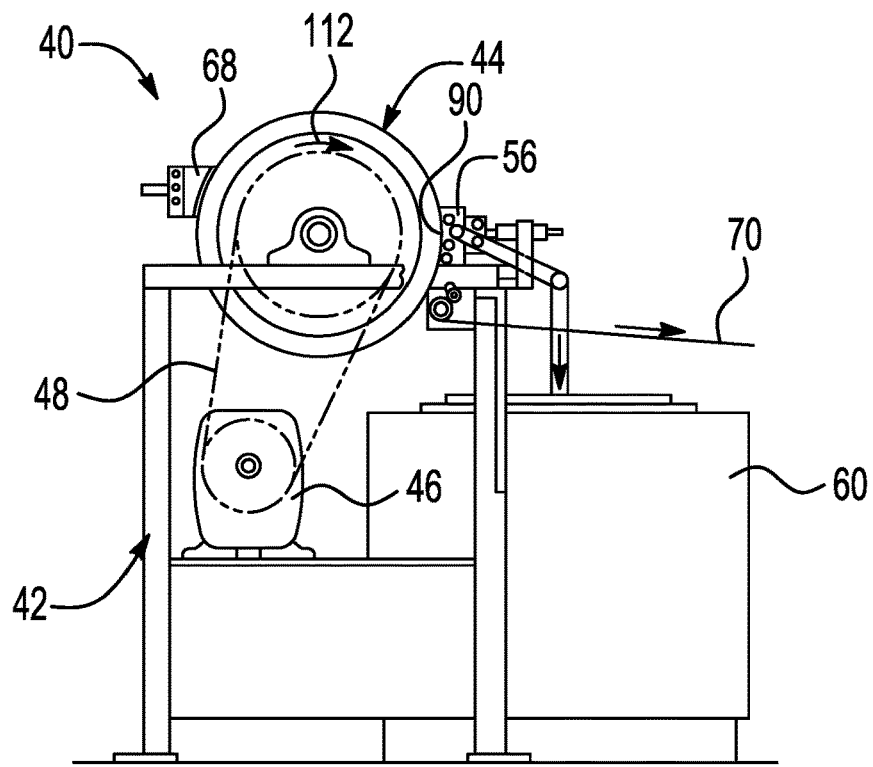
FIG. 4 is a side view of a machine for casting a lead ribbon attached along one or both edges of an elongate strip of carbon fiber material.
Figure 5:
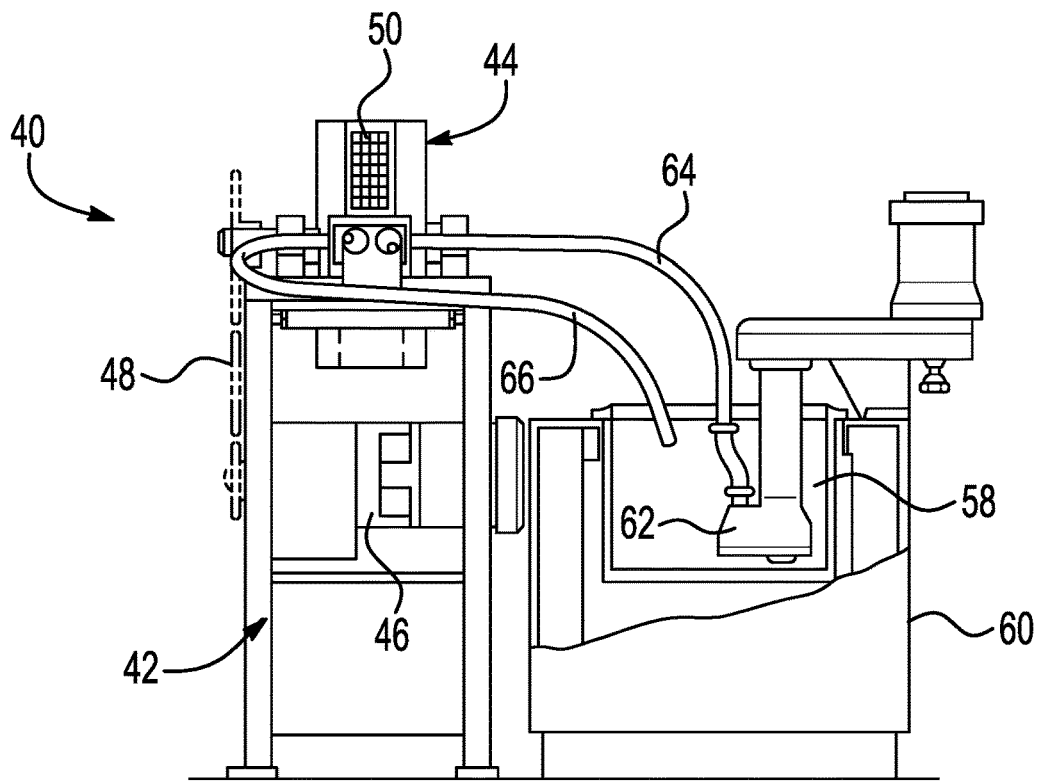
FIG. 5 is an end view of the machine of FIG. 4.
Figure 6:
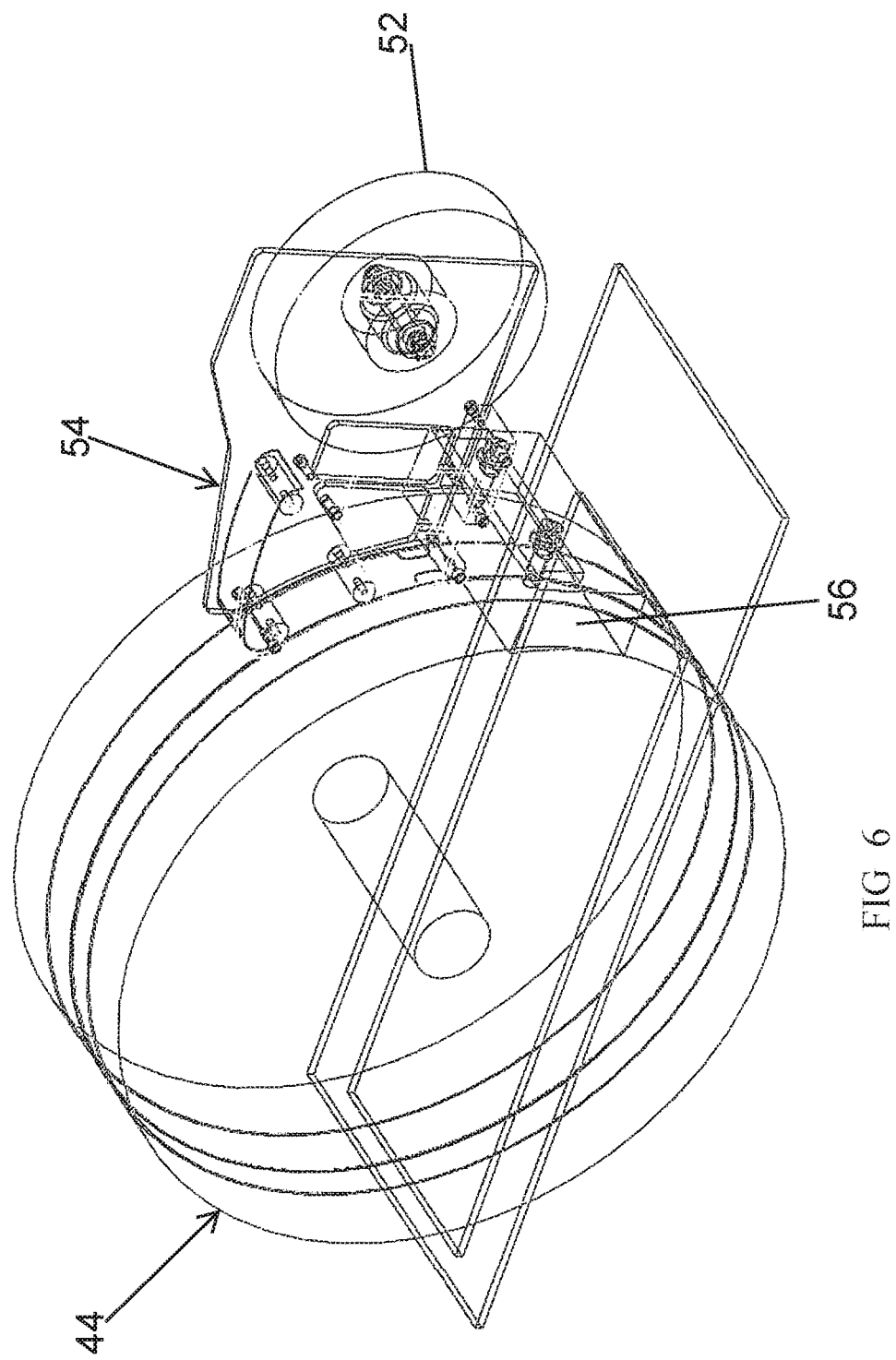
FIG. 6 is a semi-schematic perspective view of a device for unwinding a roll of an elongate strip of carbon fiber material and feeding it onto the drum of the machine of FIG. 4.
Figure 7:
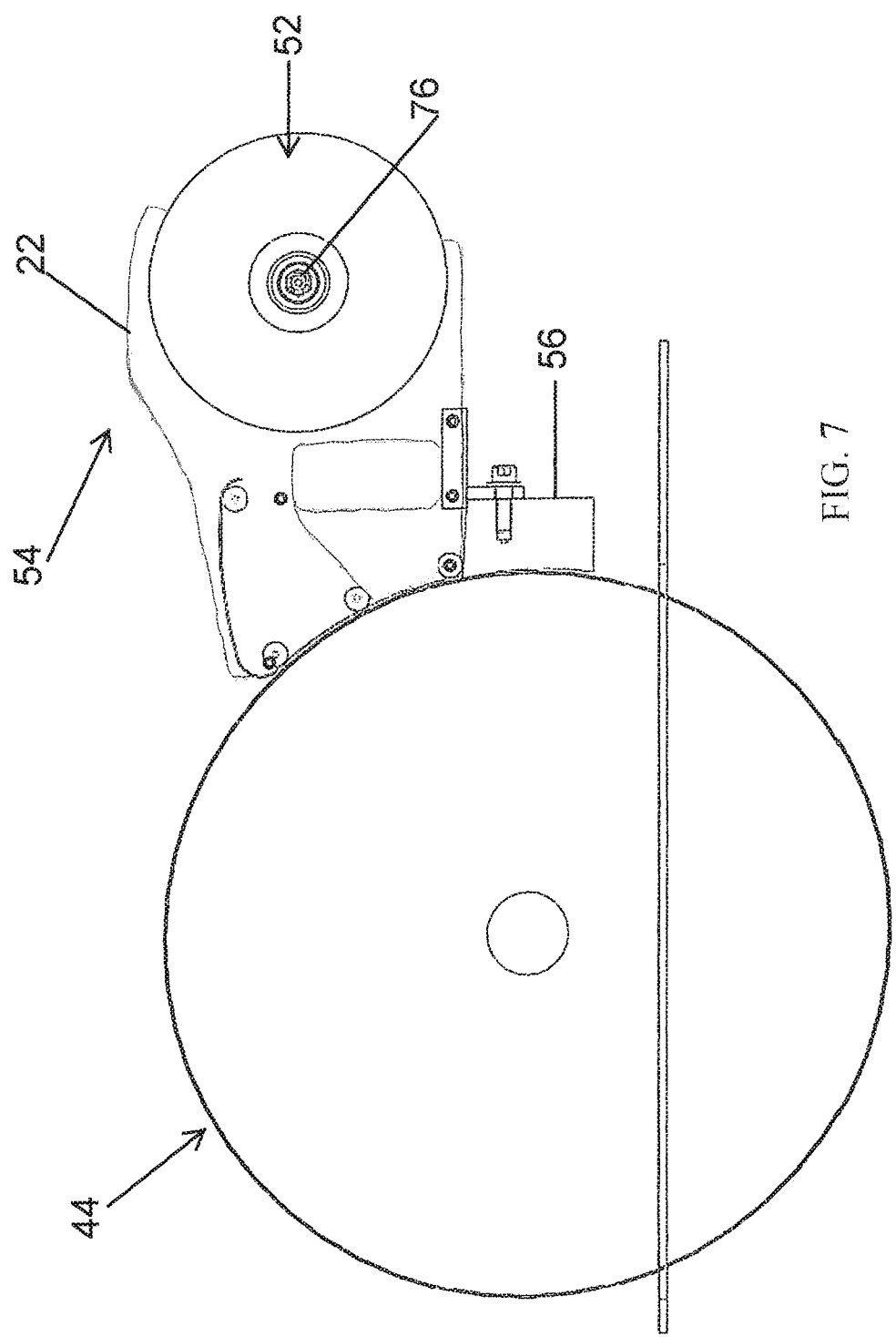
FIG. 7 is a semi-schematic side view with portions broken away of the device of FIG. 6.

FIGS. 3 and 4 illustrate a machine 40 for continuously casting a conductive lead or lead alloy ribbon 24 attached along one or both edges 26 of a longitudinally elongate strip 22 of carbon fiber material. The machine may include a frame 42 on which a casting drum 44 is journaled for rotation by a motor 46 which is desirably a variable speed electric motor drivingly connected with the drum such as by a suitable belt 48 or chain. Portions of a longitudinally elongate strip 22 of a carbon fiber material may be received on the drum 44 and the drum may have a cavity 50 (FIGS. 8-10) for casting a continuous lead ribbon or ribbons 24 respectively attached to one or both longitudinally extending edges of the carbon fiber strip of material. As shown in FIGS. 6 and 7, a roll 52 of the carbon fiber material may be unwound and disposed on the rotating drum 44 by a uncoiling device 54. In operation of the machine 40, liquid lead is supplied through a shoe 56 to a proportion of a cavity(s) 50 to cast and attach a lead ribbon or ribbons 24 along one or both longitudinal edge portions of the carbon fiber strip 22 of material. Liquid lead under pressure may be supplied from a lead pot 58 of a melting furnace 60 by a pump 62 through a conduit 64 to an inlet of the shoe 56 with excess liquid lead returned to the lead pot through a return conduit 66. Typically, the liquid lead may be supplied to the shoe 56 by the pump at a super-atmospheric pressure and a temperature in the range of about 700 to 1,100 degrees F. On a peripheral portion of the drum 50 generally opposite the shoe 56 there may be a series of thermostatically controlled water spray nozzles 68 for maintaining the outer peripheral surface of the drum at a predetermined desired temperature in the range of about 200 to 400 degrees F. The composite strip 20 of carbon fiber material with a lead ribbon or ribbons attached thereto is removed from the drum as a longitudinally elongate continuous composite strip 20 which may thereafter be severed into individual electrodes.

Figure 8:
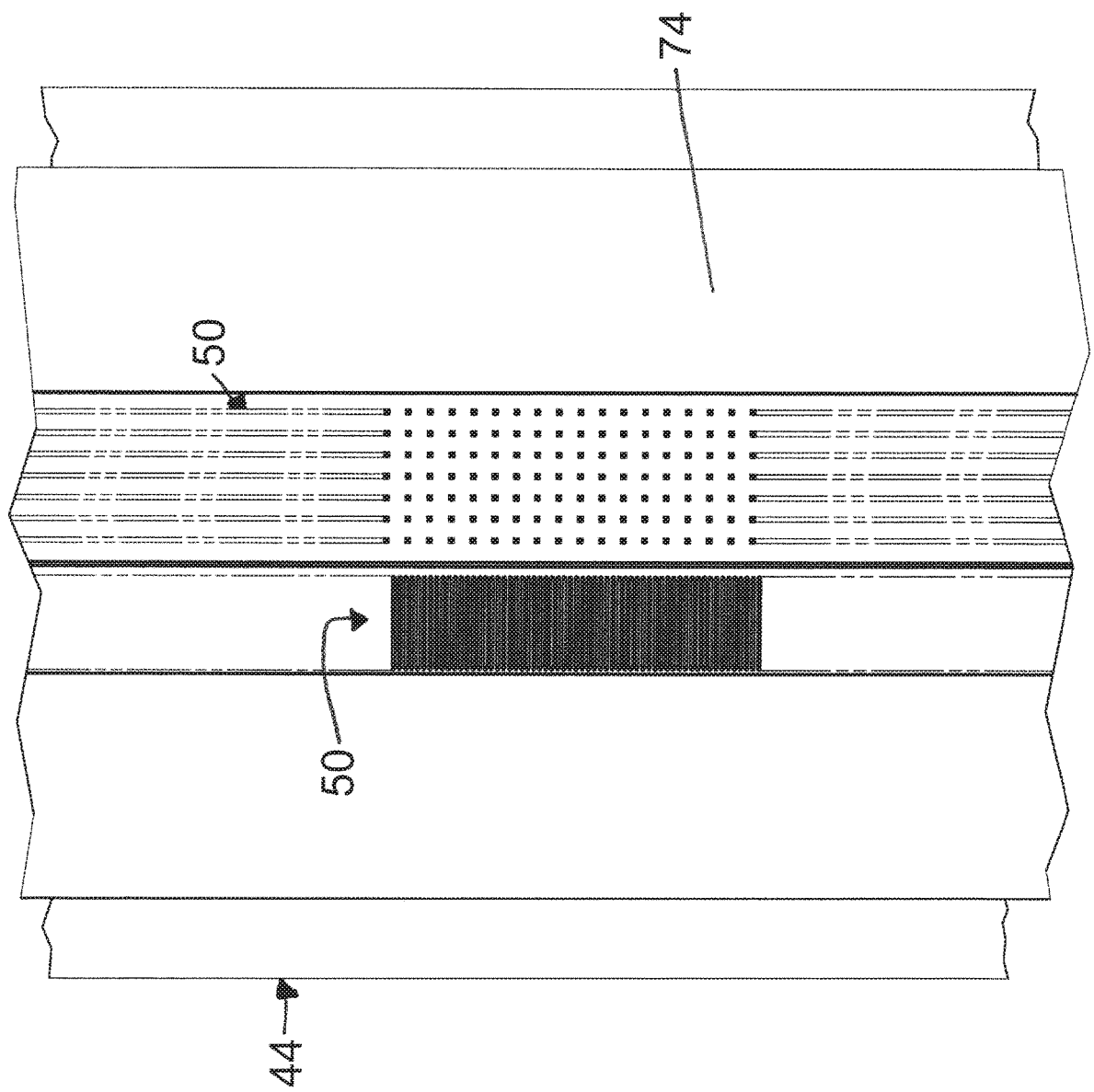
FIG. 8 is a plan view of a portion of a periphery of a casting drum of the machine of FIG. 4.
Figure 9:
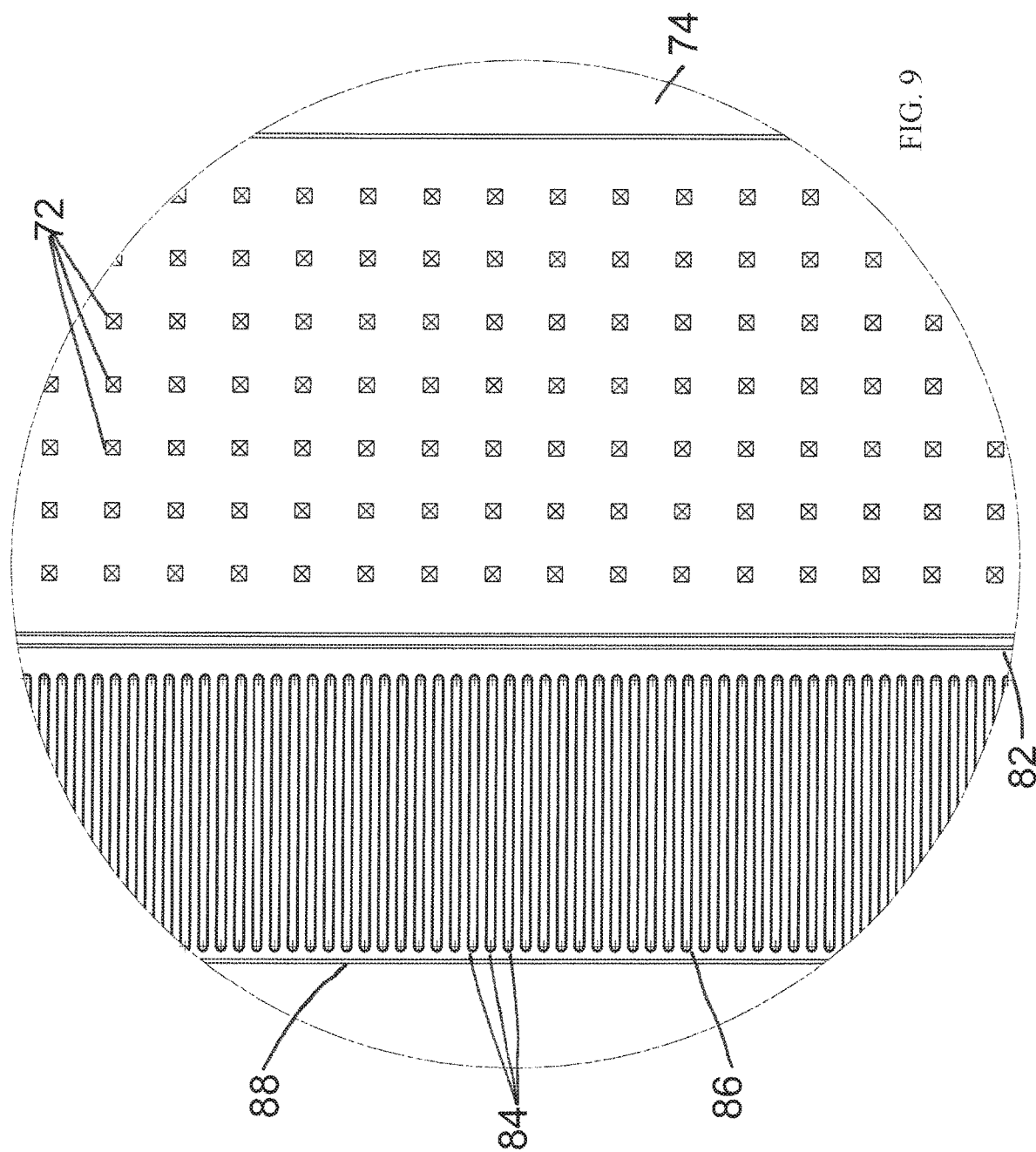
FIG. 9 is an enlarged view of the portion within the circle A of FIG. 8.
Figure 10:
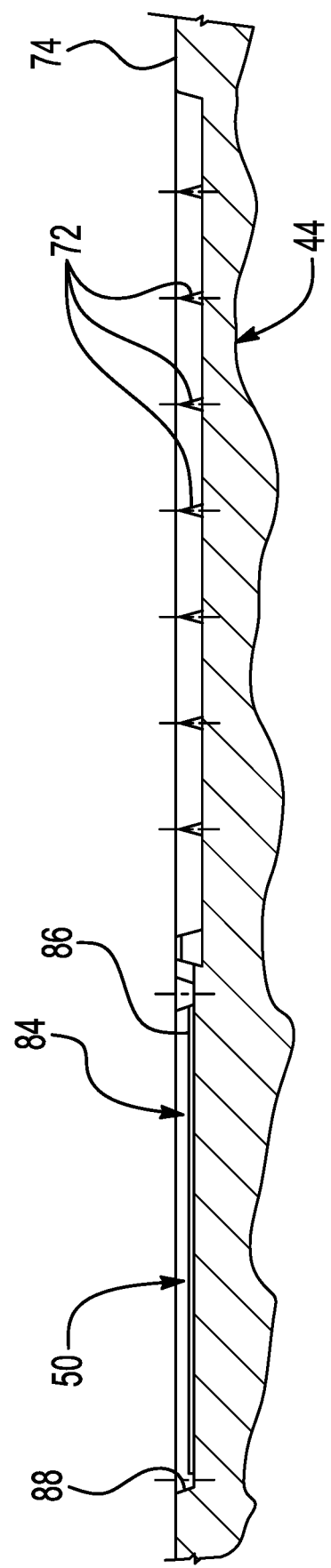
FIG. 10 is an enlarged fragmentary sectional view taken on line B-B of FIG. 9.
Figure 11:
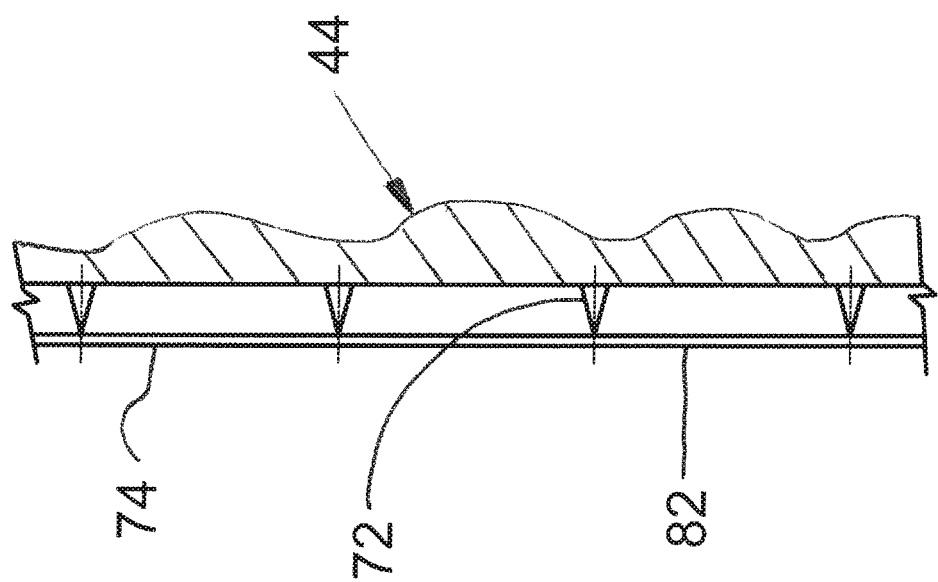
FIG. 11 is an enlarged fragmentary sectional view taken on line C-C of FIG. 9.

For retaining a portion of the carbon fiber strip 22 of material on the drum 44 while the lead ribbon or ribbons 22 are cast thereon, as shown in FIGS. 8 and 9, a plurality of circumferentially and axially spaced apart spikes 72 are disposed circumferentially continuously around peripheral surface 74 of the drum. As shown in FIG. 11, each spike may project substantially radially outward of the peripheral surface 74 of the drum typically on the order of about 0.04 to 0.06 of an inch and be tapered at an included angle typically in the range of 10 to 20 degrees and desirably about 15 degrees relative to its axis to a relatively sharp point at its distal end. In operation of the machine, these spikes 72 extend into the strip of carbon fiber so that it does not move relative to the drum while the lead ribbon or ribbons 22 are cast thereon. As shown schematically in FIGS. 6 and 7 the unwinding device 54 disposes succeeding portions of the carbon fiber strip 22 onto the drum 44 and into engagement with the spikes 72. This unwinding device 54 may include an arbor 76 on which a roll 52 of the strip 22 of carbon fiber material may be rotatably received, a guide band 78 for directing portions of the strip as it is unrolled onto the rotating drum, and rollers 80 for forcing the strip onto the spikes 72 as it passes between the rollers and the rotating drum. Desirably the rollers 80 extend transversely across the entire width of the strip and are journaled to freely rotate in response to rotation of the drum 44 and the advancement of the carbon fiber strip 22 onto the drum. Of course, persons of ordinary skill may readily devise other devices for applying successive portions for a strip 22 of a carbon fiber material onto the rotating drum 44 and into engagement with the spikes 72.

For casting each lead ribbon 24, the drum 44 may have a separate cavity 50 recessed in and extending circumferentially continuously around the peripheral surface of the drum. In the drawings only one cavity 50 for casting one lead ribbon 24 along one longitudinal edge 26 of a carbon fiber strip 22 is shown, and will be described in detail. However, for making a composite strip 20 with a lead ribbon 24 attached to each longitudinal edge 26 of a carbon fiber strip two separate cavities 50 may be provided each adjacent to and somewhat underlapping one of the longitudinal edges 26 of the strip 22 of carbon fiber. The cavity underlaps and may also overlap an adjacent edge portion 26 of the carbon fiber material and desirably has an axial end provided by a circumferentially continuous rib 82 or raised portion which tends to limit the generally axial extent to which liquid lead flows into and around the edge portion 26 of the carbon fiber strip. To at least some extent, the liquid lead penetrates into an edge portion of the carbon fiber material extending into the cavity and when solidified attaches or secures the lead ribbon to the carbon fiber materials and provides an electrically conductive path or conductor for the carbon fiber material. In at least some instances the liquid lead may saturate at least part of the edge portion of the carbon fiber material.

Figure 12:
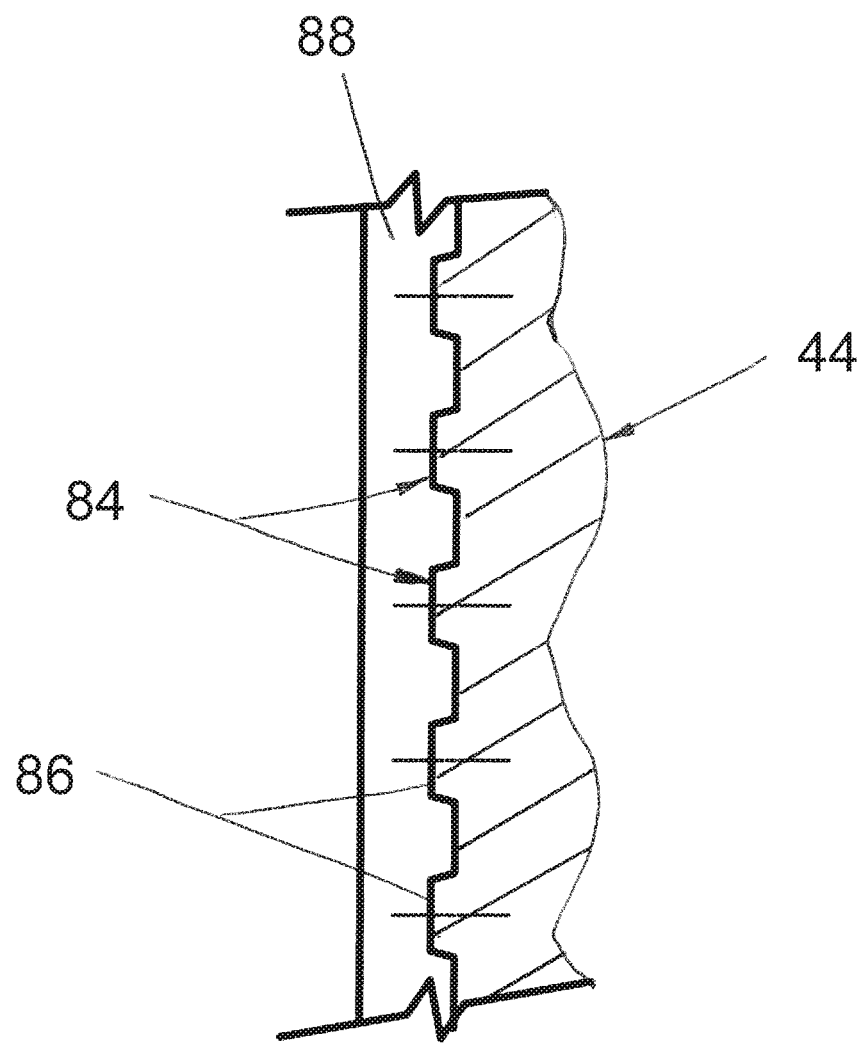
FIG. 12 is an enlarged fragmentary sectional view taken on line D-D of FIG. 9.

Desirably to cast a lead ribbon 24 having a sinuous surface with a plurality of circumferentially spaced apart and transversely extending cogs or grooves, the cavity 50 may have a plurality of circumferentially spaced apart and axially extending bars or lands 84 in the cavity and disposed completely around the cavity. As shown in FIG. 12, each land 84 extends generally radially outward of the base of the cavity and may have a height or extent less than the depth of the cavity so that the outer face 86 of each land is disposed radially below or inboard of the peripheral surface 74 of the drum. The generally axial outer edge 88 of the cavity is desirably axially outboard of the adjacent end of the lands 84. The serrated, sinuous or cogged surface of each lead ribbon ensures that when solidified and while the ribbon is still being carried by the rotating drum 44, it does not move or shift generally circumferentially with respect to the portion of the strip 22 of carbon fiber on the drum to which it is joined or attached and after removal from the drum it may facilitate further downstream processing of the elongate composite strip 20 such as for advancing the strip or web through a die for punching locator holes, forming lugs on of the lead ribbons, pasting the composite strip, cutting or severing the composite strip into individual battery electrodes, etc.

Figure 13:
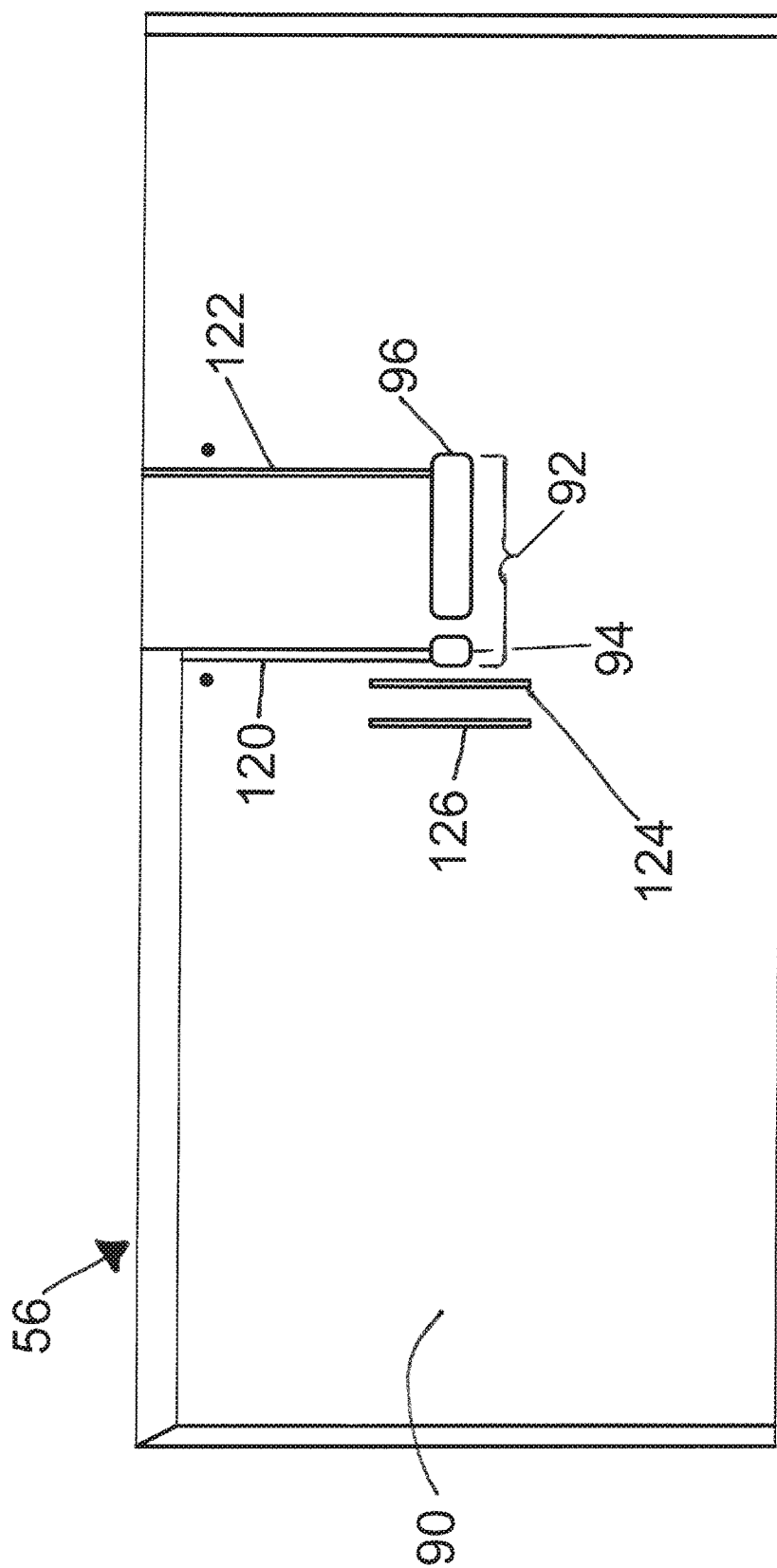
FIG. 13 is a front view of a shoe of the machine of FIG. 4.
Figure 14:
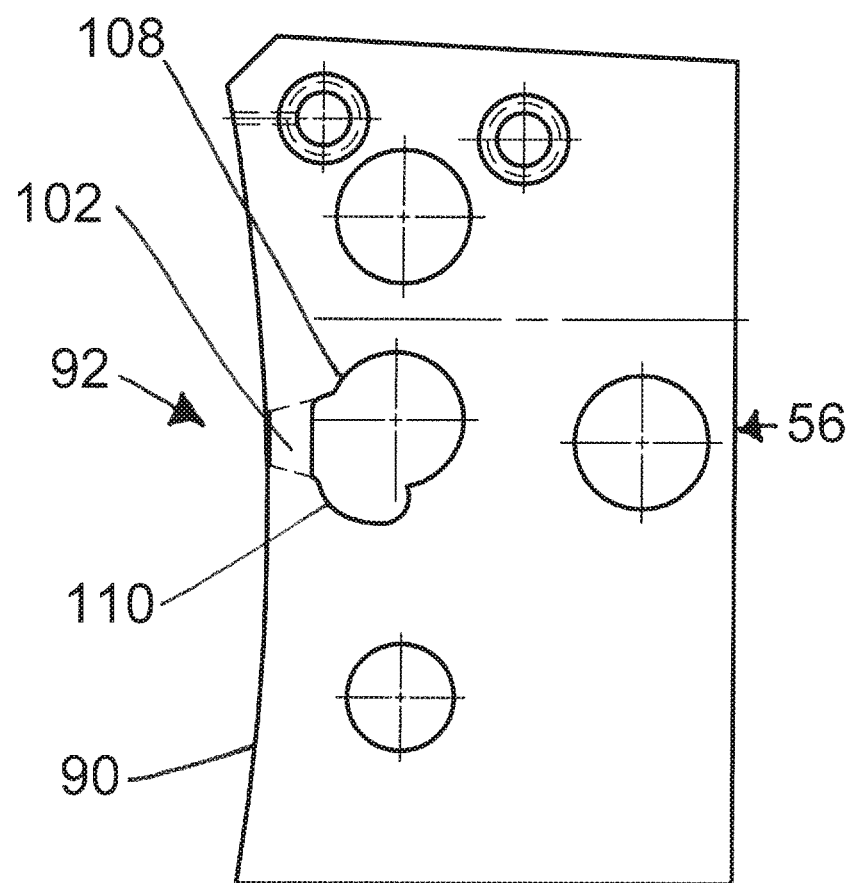
FIG. 14 is an end view of the shoe of FIG. 13.
Figure 15:
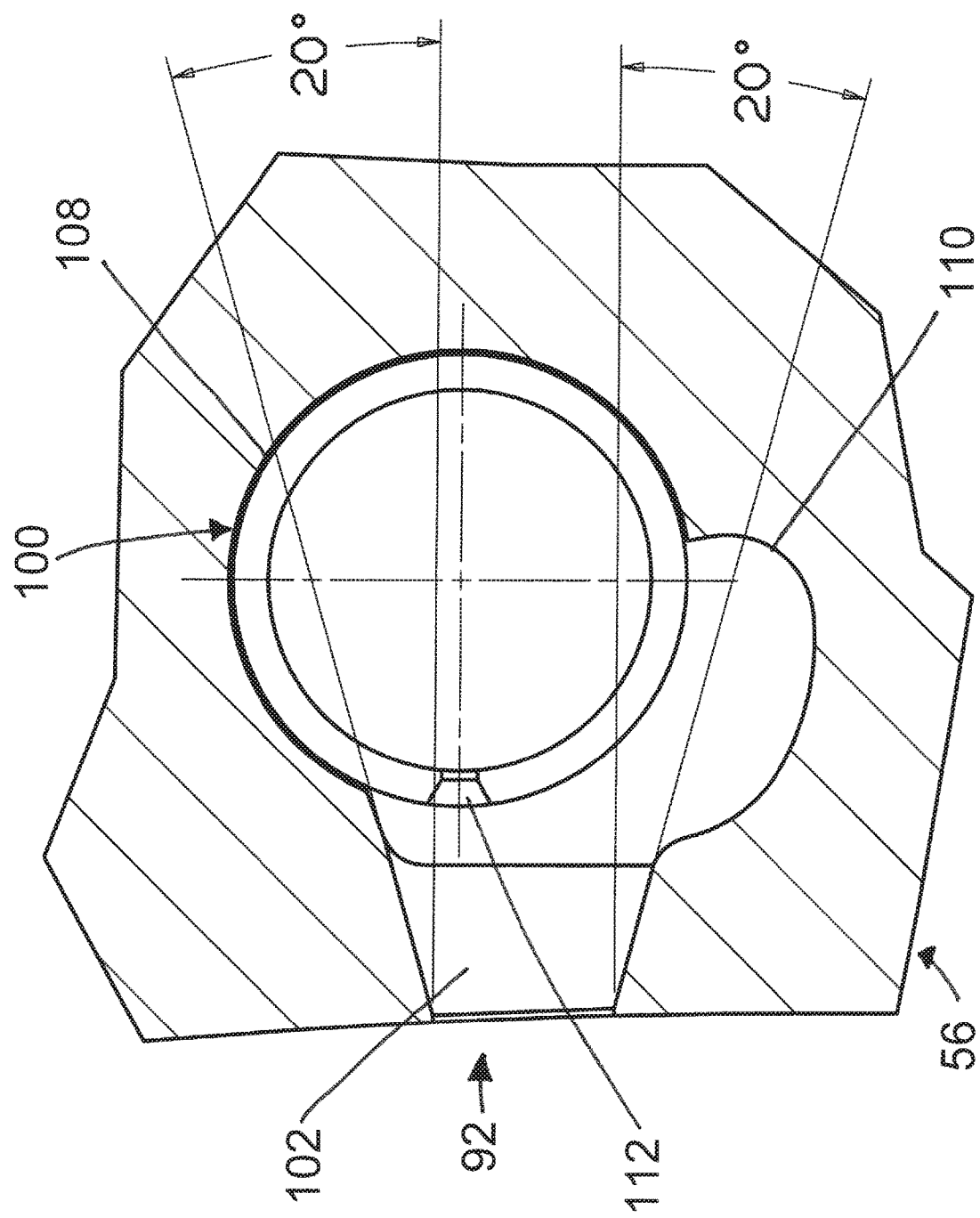
FIG. 15 is an enlarged fragmentary sectional view taken on line E-E of FIG. 13.
Figure 16:
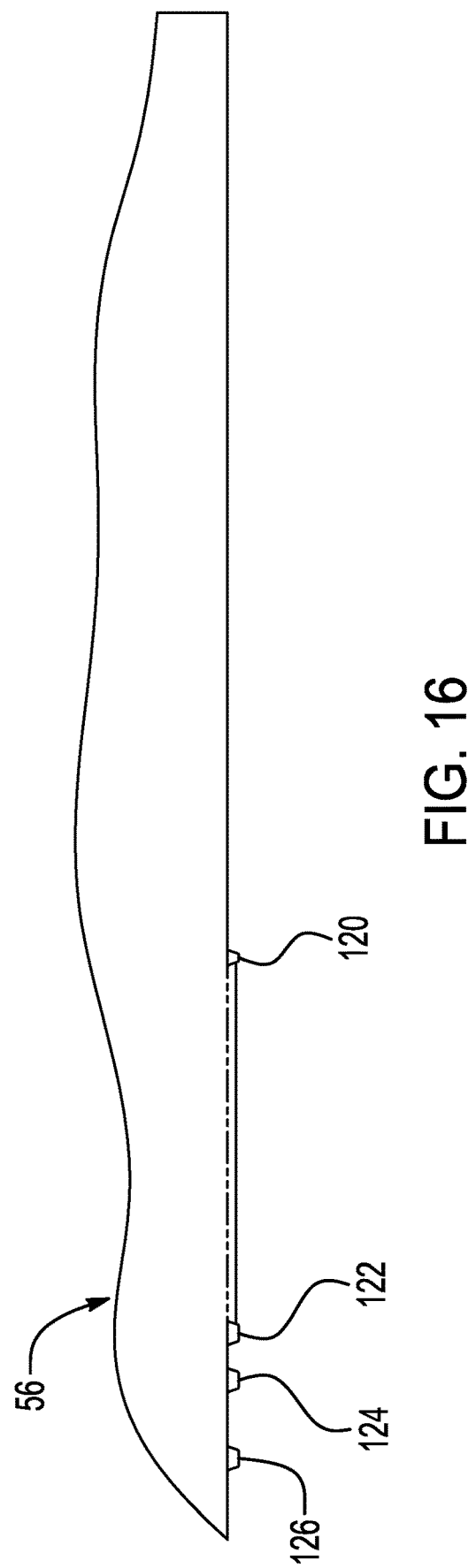
FIG. 16 is an enlarged fragmentary top view of the shoe of FIG. 13.
Figure 17:
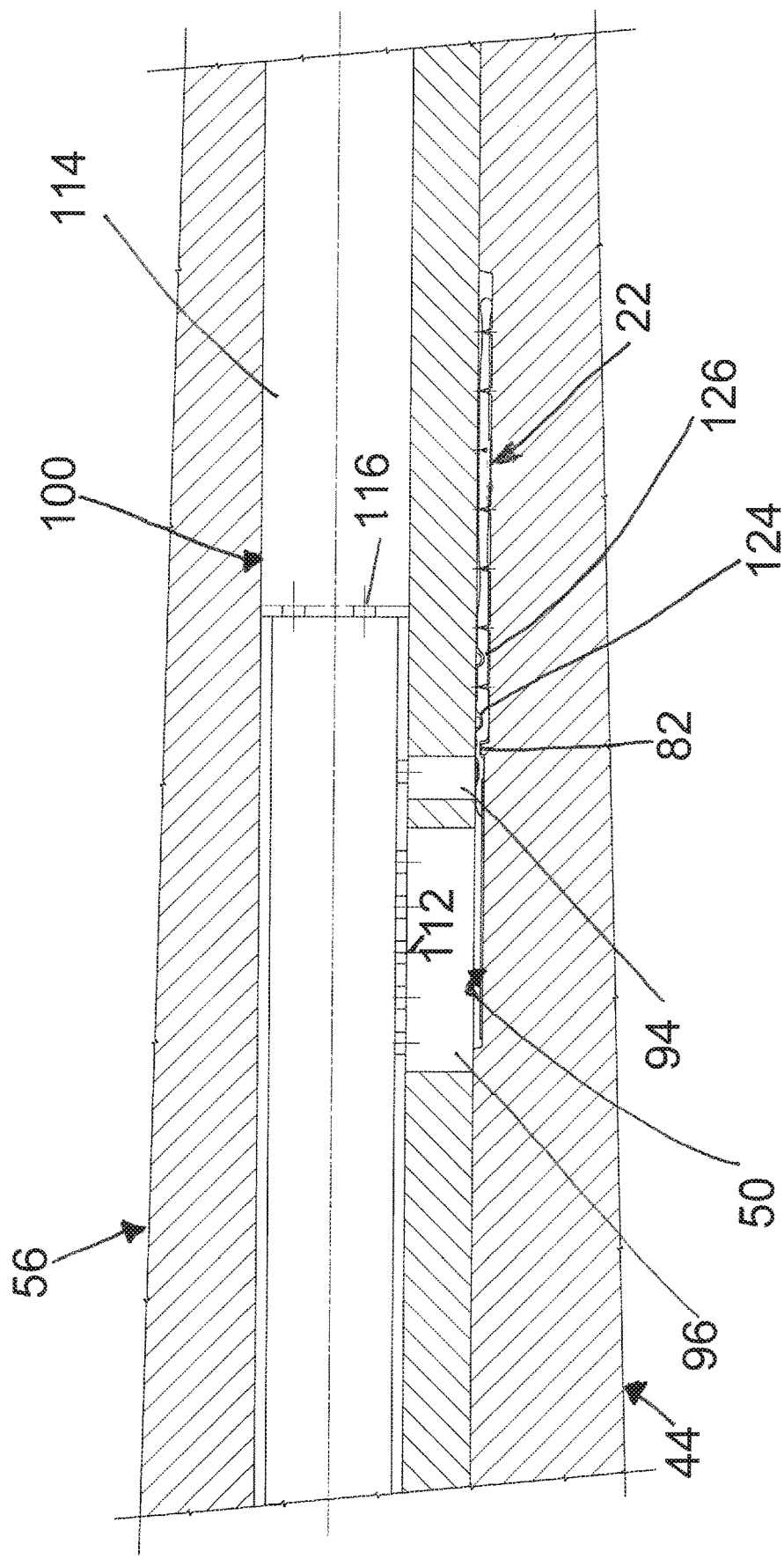
FIG. 17 is a semi-schematic enlarged fragmentary sectional view of the shoe confronting the drum of the machine of FIG. 4.

In operation of the machine 40, liquid lead is continuously supplied to the cavity 50 of the rotating drum 44 through the shoe 56. As shown in FIGS. 13 and 14 the shoe 56 has an arcuate outer face 90 for complimentary mating engagement with a portion of the periphery of the drum 44. The shoe 56 may supply liquid lead to each cavity 50 of the drum with a continuous flow of liquid lead through a separate orifice 92 opening through the arcuate face 90 of the shoe. Desirably the orifice 92 may have two outlet openings 94 & 96, slightly spaced apart from each other. The openings 94 and 96 may have a generally rectangular configuration and the opening 96 may be elongate and disposed longitudinally generally parallel to the axis of rotation of the drum. Typically the opening 94 of the orifice through the face 90 has an axial extent in the range of about 0.15 to 0.25 and desirably about 0.18 of an inch and in assembly overlies an edge portion 26 of the strip 22 of carbon material. The opening 96 of the orifice may have an axial extent in the range of about 1.0 to 1.04, desirably about 1.03 of an inch and in assembly overlies the cavity 50 in the drum 44. Both openings of the orifice may have a circumferential extent in the range of about 0.2 to 0.3 and desirably about 0.25 of an inch and may be axially separated by about 0.12 of an inch. As shown in FIGS. 15 and 17 liquid lead may be supplied under pressure to both a passage 98 extending generally axially through the shoe 56 and through a tube 106 received in the passage. The passage 98 may open onto the orifice outlet openings 94 & 96 through a passage 102 defined by tapered walls around the periphery of the orifice. Desirably the orifice passage 102 has axial end walls 104 tapered or inclined at an included angle of about 35 degrees and side walls 96 tapered or inclined at an included angle of about 20 degrees relative to a radius of the arcuate face extending through the orifice as shown in FIG. 15. The passage 98 extends through the shoe and in cross section (FIG. 15) has a generally circular portion 108 which adjacent its upper edge merges into the orifice passage 102 and adjacent its lower edge merges into a kidney or bowl shaped portion 110 extending below the lower edge of the orifice passage 102 and rising to merge into the lower edge of the orifice passage 102 relative to the direction of rotation 112 of the drum. As shown in FIGS. 15 and 17, desirably liquid lead is also supplied to the orifice through the tube 100 with a plurality of apertures or holes 112 opening toward the orifice passage 102 and a downstream end wall 114 with through holes 116. In use, excess liquid lead not entering the cavity 50 is returned through the downstream end of the shoe passage 98 to the furnace pot 58 of liquid lead. The apertures or holes 112 through the tube 100 tend to direct liquid lead generally radially through the orifice 92 and into the cavity 50 of the rotating drum 44 to facilitate casting of a solid lead ribbon 24. Excess liquid lead flowing through the shoe 56 heats it and insures liquid lead at a desired temperature is supplied to the cavity 50.

Ribs 120 and 122 project outwardly from the face 90 of the shoe and in assembly with the drum as shown in FIG. 17 extend into the cavity 50 adjacent its axial ends to in use inhibit liquid lead from flowing upstream relative to the direction of rotation 112 of the drum. Short ribs 124 and 126 projecting outwardly from the face 90 of the shoe and disposed generally axially outward of the orifice 92, in operation of the machine 40, tend to also inhibit and reduce the extent of axial flow of liquid lead into the carbon fiber material. In operation of the machine 40, the extent of the axial flow of liquid lead into the carbon fiber strip 22 is also reduced by compression of a proportion this strip between the circumferential rib 82 of the drum and the opposed face 90 of the shoe. However, the extent of this compression must be limited so that the carbon fiber material is not torn or unduly stressed by movement of it by the drum 44 relative to the shoe 56. The extent to which this compression of the carbon fiber material must be limited to avoid tearing or undue stretching of the carbon fiber material may need to be empirically determined depending on various factors including the thickness and density of the strip 22 of the carbon fiber material, the speed at which the drum 44 rotates, the width of this rib 82, etc. It is believed the carbon fiber material may be compressed to 30% to 50% of its uncompressed nominal thickness. For a carbon fiber material having a nominal thickness of about 0.060 of an inch, a rib 82 with an axial width of about 0.06 of an inch and a rotary drum speed of about 80 to 100 lineal feet/minute, a compression of the strip to a thickness of about 0.020 of an inch has been empirically determined to be satisfactory. If desired small vent holes 128 of about 0.94 of an inch in diameter may be provided through the face 90 of the shoe and upstream of the orifice 92 relative to the direction of rotation 112 of the drum The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A machine for casting a composite lead carbon fiber battery electrode comprising,
a rotatable drum having a plurality of spaced apart grippers disposed around a circumference of the drum and configured to engage at least part of a strip of carbon fiber material and releasably retain it on the drum and at least one mold cavity extending circumferentially around the drum and configured to underlie only a portion of a transverse width of a longitudinally elongate strip of carbon fiber material received in part on the drum for casting a lead strip attached to a portion of the strip of carbon fiber material overlying the mold cavity;
a shoe having a curved surface complementary with an arcuate segment of the drum and having at least one orifice therein opening at a portion of the curved surface between circumferentially opposed ends of the curved surface and onto at least part of the mold cavity and configured to supply liquid lead to the mold cavity and at least a portion of the strip of carbon fiber material overlying the mold cavity, and the shoe having an inlet and an outlet communicating with the orifice slot; and
a device for supplying liquid lead at a superatmospheric pressure to the inlet in a quantity in excess of that required to supply a continuous flow of liquid lead through the orifice to fill a portion of the mold cavity and engage and at least in part penetrate at least part of the carbon fiber strip overlaying the mold cavity as they rotate past the orifice and so that excess liquid lead flows through the outlet.

2. The machine of claim 1 wherein the drum also comprises a rib extending circumferentially around the drum and spaced axially inward of an edge of the strip of carbon fiber material and under the strip of carbon fiber material and configured to at least in part limit the axial extent to which liquid lead from the orifice extends generally axially onto the strip of carbon fiber material.

3. The machine of claim 2 wherein the rib is circumferentially continuous around the drum.

4. The machine of claim 1 wherein the orifice of the shoe comprises a first portion extending generally axially across at least part of the cavity and a second portion extending across at least part of an adjacent portion of the strip of carbon fiber material and spaced from the first portion of the orifice.

5. The machine of claim 2 wherein the orifice of the shoe comprises a first portion extending generally axially across at least part of the cavity and a second portion extending across at least part of an adjacent portion of the strip of carbon fiber material and spaced from the first portion of the orifice.

6. The machine of claim 3 wherein the orifice of the shoe comprises a first portion extending generally axially across at least part of the cavity and a second portion extending across at least part of an adjacent edge portion of the strip of carbon fiber material and spaced from the first portion of the orifice.

7. The machine of claim 1 wherein the cavity comprises a plurality of circumferentially spaced apart ribs in and disposed around the cavity.

8. The machine of claim 7 wherein the ribs in the cavity extend generally parallel to an axis of rotation of the drum.

9. The machine of claim 1 wherein the shoe also comprises a rib adjacent one end of the orifice, projecting into the cavity, and extending circumferentially upstream of the orifice relative to a direction of rotation of the drum.

10. The machine of claim 2 wherein the shoe also comprises a rib adjacent one end of the orifice, projecting into the cavity, and extending circumferentially upstream of the orifice relative to a direction of rotation of the drum.

11. The machine of claim 4 wherein the shoe also comprises a rib adjacent one end of the orifice, projecting into the cavity, and extending circumferentially upstream of the orifice relative to a direction of rotation of the drum.

12. The machine of claim 1 wherein the shoe also comprises a first rib adjacent one end of the orifice, projecting into the cavity, and extending circumferentially upstream of the orifice slot relative to the direction of rotation of the drum and a second rib adjacent the other end of the orifice, projecting into the cavity, and extending circumferentially upstream of the orifice relative to a direction of rotation of the drum.

13. The machine of claim 1 wherein the orifice comprises an elongate slot.

14. The machine of claim 1 wherein the shoe also comprises at least one rib bearing on the strip of carbon fiber material, spaced from the orifice, and spaced axially inward from an adjacent edge of the sheet of fiber material, and compressing the fiber material between such rib and the drum.

15. The machine of claim 2 wherein the shoe also comprises at least one rib bearing on the strip of carbon fiber material, spaced from the orifice, and spaced axially inward from an adjacent edge of the sheet of fiber material, and compressing the fiber material between such rib and the drum.

16. The machine of claim 4 wherein the shoe also comprises at least one rib bearing on the strip of carbon fiber material, spaced from the orifice, and spaced axially inward from an adjacent edge of the sheet of fiber material, and compressing the fiber material between such rib and the drum.

17. The machine of claim 5 wherein the shoe also comprises at least one rib bearing on the strip of carbon fiber material, spaced from the orifice, and spaced axially inward from an adjacent edge of the sheet of fiber material, and compressing the fiber material between such rib and the drum.

18. The machine of claim 7 wherein the shoe also comprises at least one rib bearing on the strip of carbon fiber material, spaced from the orifice, and spaced axially inward from an adjacent edge of the sheet of fiber material, and compressing the fiber material between such rib and the drum.

19. The machine of claim 9 wherein the shoe also comprises at least one rib bearing on the strip of carbon fiber material, spaced from the orifice, and spaced axially inward from an adjacent edge of the sheet of fiber material, and compressing the fiber material between such rib and the drum.

20. The machine of claim 12 wherein the shoe also comprises at least one rib bearing on the strip of carbon fiber material, spaced from the orifice, and spaced axially inward from an adjacent edge of the sheet of fiber material, and compressing the fiber material between such rib and the drum.

* * * * *